J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 1.

Inventor
John Brockbank, deceased
By
Thomas W. Garrett, administrator
By
B. Singer, Atty

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 2.

Inventor
John Brockbank, deceased
By Thomas W. Garrett, administrator
Pat
R. Singer, Atty

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 3.

Inventor:
John Brockbank, deceased
By Thomas W. Garrett, administrator
By R. Singer, Atty.

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 4.

Inventor
John Brockbank, deceased
By
Thomas W. Garrett, administrator
By
B. Singer, Atty

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 5.

Inventor:
John Brockbank, deceased
By Thomas W. Garrett, administrator
By B. Singer, Atty.

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 6.

Inventor:
John Brockbank, deceased
By
Thomas W. Garrett, administrator
By
B. Linser, Atty

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 7.

Inventor:
John Brockbank, deceased
By
Thomas W. Garrett, administrator
By
B. Singer, Atty.

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 8.

Inventor:
John Brockbank, deceased
By
Thomas W. Garrett, administrator
By
B. Singer, Atty.

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 9.

Inventor:
John Brockbank, deceased
By Thomas W. Garrett, administrator
By B. Singer, Atty

J. BROCKBANK, DEC'D.

T. W. GARRETT, ADMINISTRATOR.

PROCESS AND APPARATUS FOR GRINDING LENSES.

APPLICATION FILED APR. 9, 1919.

Reissued Nov. 18, 1919.

14,751.

10 SHEETS—SHEET 10.

Inventor:
John Brockbank, deceased
By Thomas W. Garrett, administrator
By B. Singer, atty

UNITED STATES PATENT OFFICE.

JOHN BROCKBANK, DECEASED, BY THOMAS W. GARRETT, ADMINISTRATOR, OF SYDNEY, NEW SOUTH WALES, AUSTRALIA.

PROCESS AND APPARATUS FOR GRINDING LENSES.

14,751. Specification of Reissued Letters Patent. Reissued Nov. 18, 1919.

Original No. 1,221,280, dated April 3, 1917, Serial No. 61,782, filed November 16, 1915. Application for reissue filed April 9, 1919. Serial No. 288,895.

*To all whom it may concern:*

Be it known that I, THOMAS WILLIAM GARRETT, a subject of the King of Great Britain and Ireland, a resident of Culwulla Chambers, Castlereagh street, Sydney, in the State of New South Wales, Commonwealth of Australia, public trustee and duly appointed administrator of the estate of the late JOHN BROCKBANK, deceased, who invented certain new and useful Improvements in Processes and Apparatus for Grinding Lenses, of which the following is a specification.

This invention relates to lens grinding and refers to a new or improved method whereby blanks of glass or other material can be accurately ground to any predetermined plano surface or any spherical, cylindrical, toric, or compound curve without the use of curved laps.

According to the present practice lenses are ground by means of curved laps or grinding tools; thus each curvature of lens requires a series of special laps which owing to immediate surface wear have to be frequently refaced or a new lap of correct curvature substituted, consequently from the very start the present process of lens grinding makes toward inaccuracy of curve, and necessitates frequent measuring during the process of grinding. Further the present process is slow and great difficulty is experienced in grinding two or more lenses that are each true to the same specification.

As the method of lens grinding which forms the subject of this invention is based on true geometrical principles the process of grinding must from the start make toward accuracy and the lenses produced must become eventually of true curve thus free from aberration or distortion.

The invention embodies the principle that if two opposing surfaces of suitable material such as glass, flint or the like are held together in grinding contact while one or both are rotating, a plane surface will be ground on each, but if one or other of the surfaces is caused to move through an arc a curve will be ground on each surface, and such curve will vary according to the radius of the arc of movement of one of them. Further, if one of the opposing surfaces is composed of hard abrading material such as carborundum or the like, and the other surface is of glass, or flint, a curve will be ground on the latter and such curve will be either convex or concave, according to the relative movement of the two surfaces.

A feature of the invention is that during the process it is not necessary to measure the curve as grinding automatically stops when the predetermined curve is completed. A further feature of the invention is that lenses can be produced more accurately, cheaper and quicker than by the present process of grinding, more accurately because the element of inaccuracy caused by surface wear of the curved lap is eliminated, more cheaply because curved laps and other curved grinding tools are done away with, more quickly because curved laps or tools have not to be refaced or duplicated, and because the machine for carrying out the invention can be duplicated to any extent.

The invention is best carried out by mounting the opposing surfaces on separate spindles that are adapted to be revolved, and have a common axial line. One or other of the spindles is adapted to have imparted to it a variable radii swing from centers in their common axial line, and means is provided for controlling the arc movement of such swing. Means is also provided for holding the opposing surfaces in grinding contact and for controlling same. One or other of the spindles is also adapted to move laterally and to have imparted to it a reciprocating motion.

The invention further relates to improvements in apparatus for carrying out the process before mentioned and more particularly described herein.

The apparatus has been constructed as to enable various forms and shapes and powers of lenses described to be carried out.

The apparatus consists essentially of a framing having bearings for a pair of spindles mounted upon a common axial line and carrying on their opposing ends blanks, which blanks are held in contact with one another during the grinding action. One of the spindles is also adapted to move through an arc and the other spindle to move axially and when the desired shape of lens or lenses has been achieved the grinding action ceases automatically.

In order to produce lenses of any power required the spindle that moves in an arc is adapted to be adjusted to alter the length of the radius of the arc through which the blank is adapted to move, a scale being attached for the purpose, also affixed to the apparatus is another scale and indicator to obtain the length of the chord of the arc required. This spindle is also adapted to be locked so as not to rotate when moving in an arc when other shaped lenses are required.

The other spindle besides moving axially can also move laterally and be prevented from rotating for further differently shaped lenses.

But in order that the invention and the method of carrying it out may be clearly understood reference will now be made to the drawings which accompany this complete specification and in which:—

Figure 1:
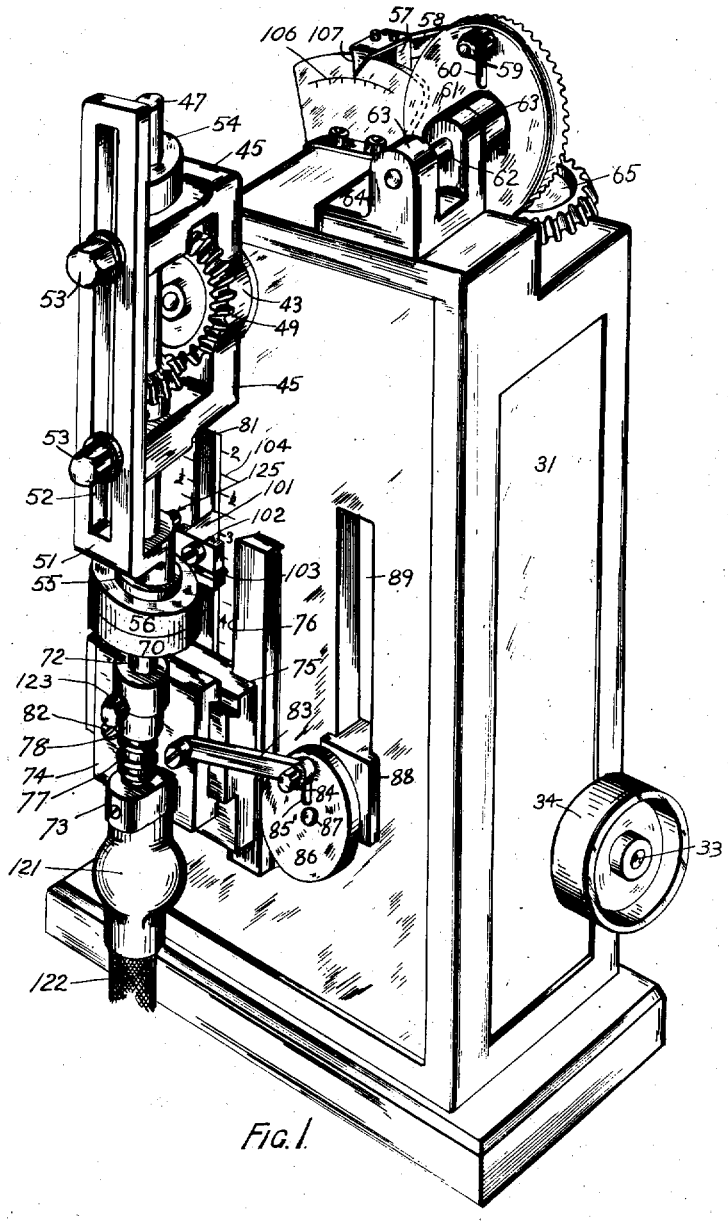
Figure 1 is a perspective view of the apparatus complete.
Figure 2:
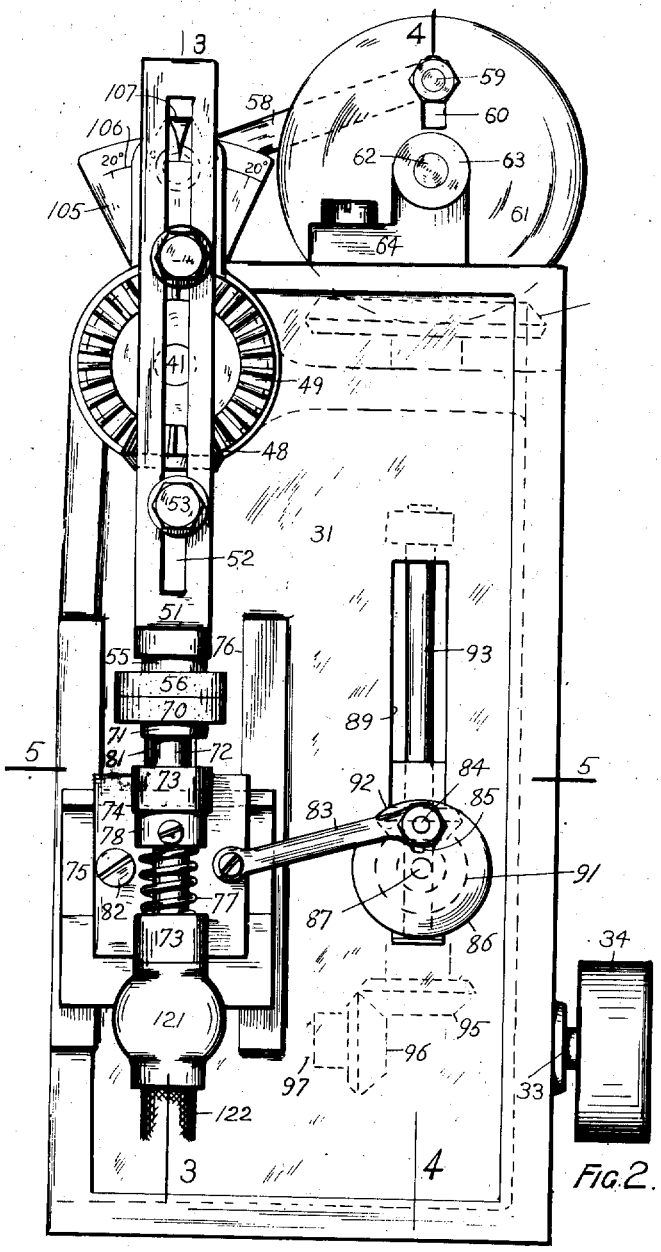
Fig. 2 is a front elevation thereof.
Figure 3:
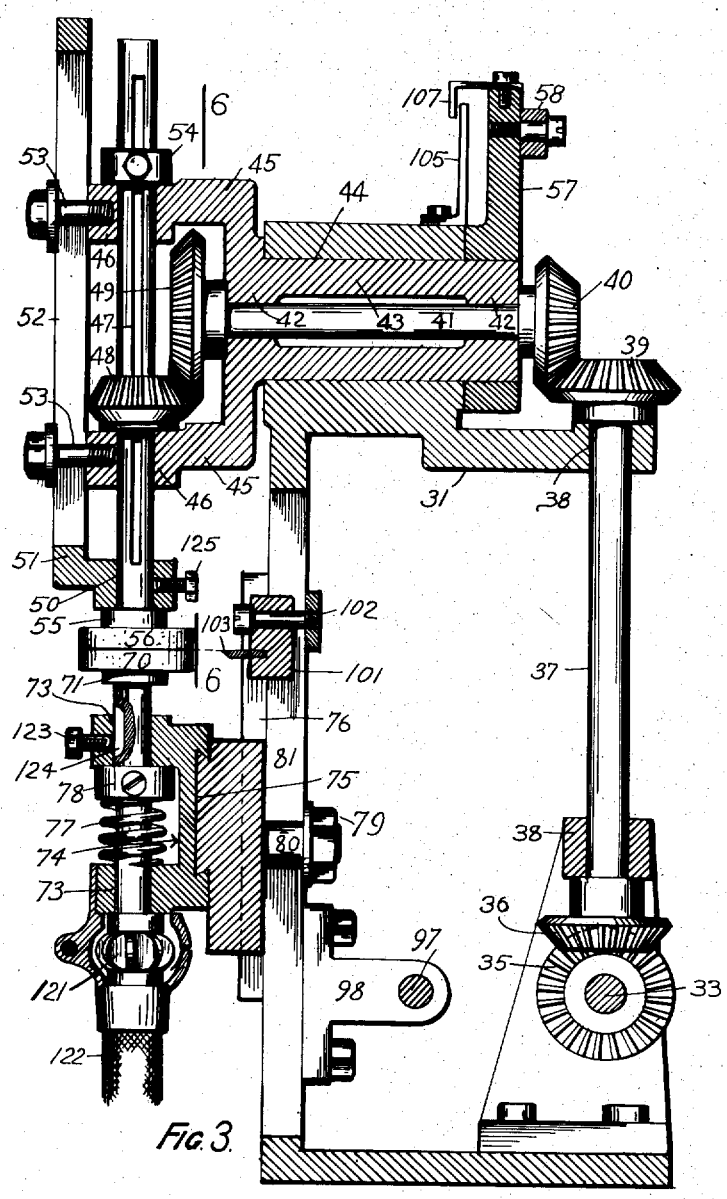
Figure 4:
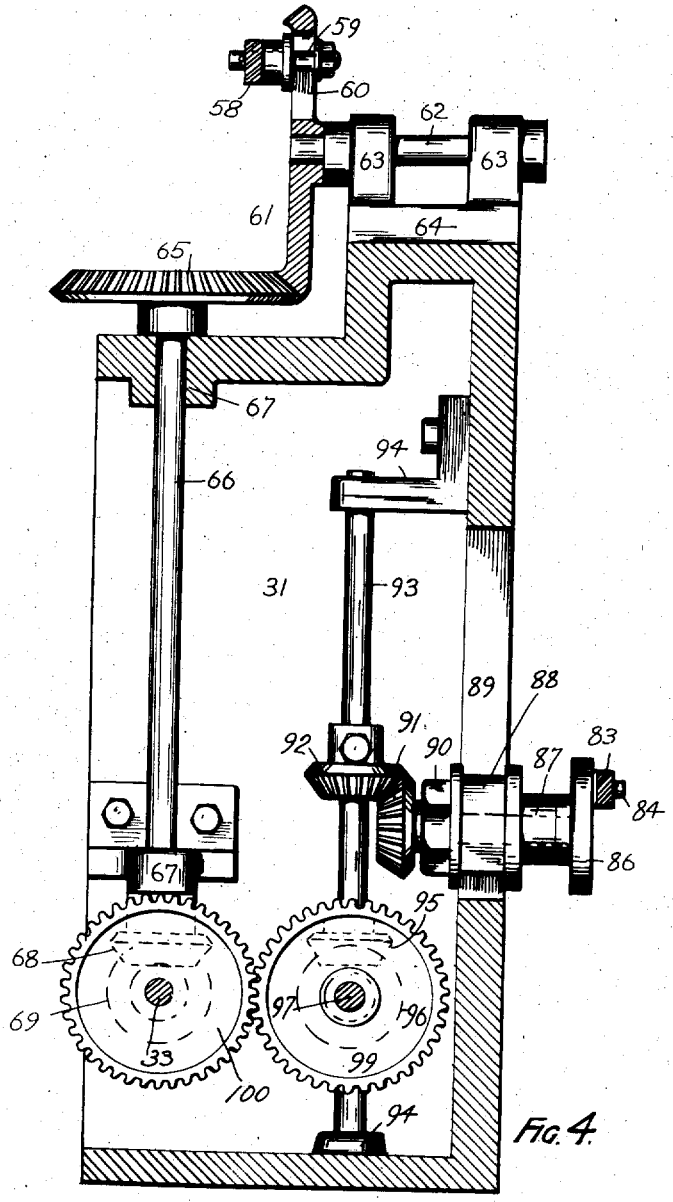

Figs. 3 and 4 are sectional elevations on lines 3—3 and 4—4 respectively in Fig. 2.

Figure 5:
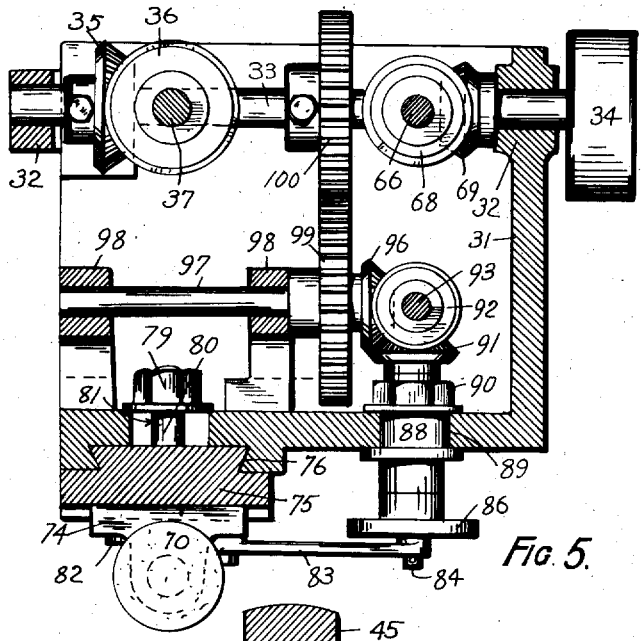

Fig. 5 is a sectional plan on line 5—5 in Fig. 2.

Figure 6:
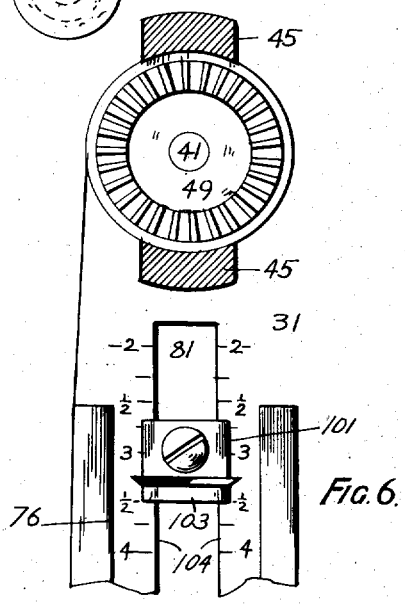

Fig. 6 is a sectional elevation on line 6—6 in Fig. 3.

Figure 7:
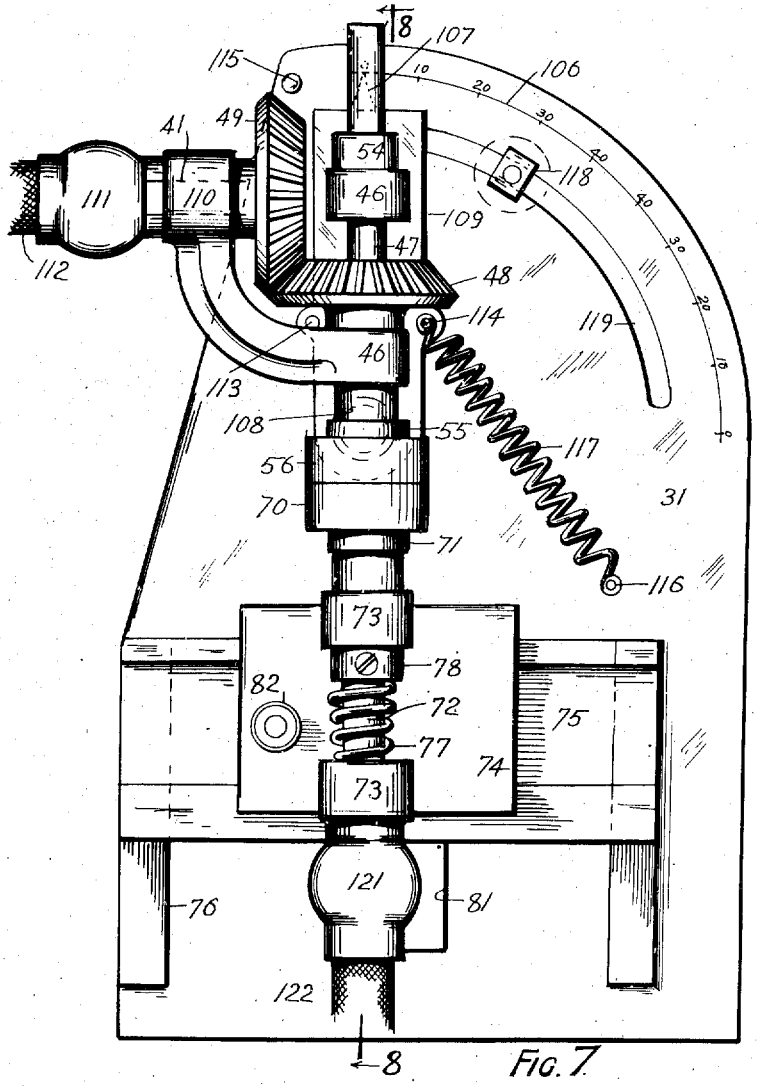

Fig. 7 a front elevation of a modified form or construction of the apparatus.

Figure 8:
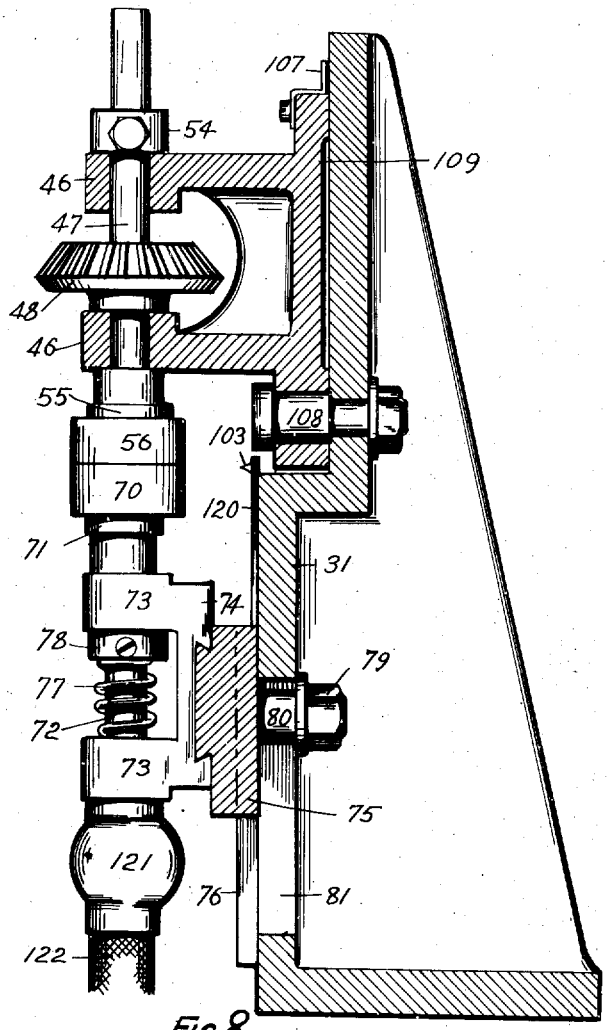
Figure 9:
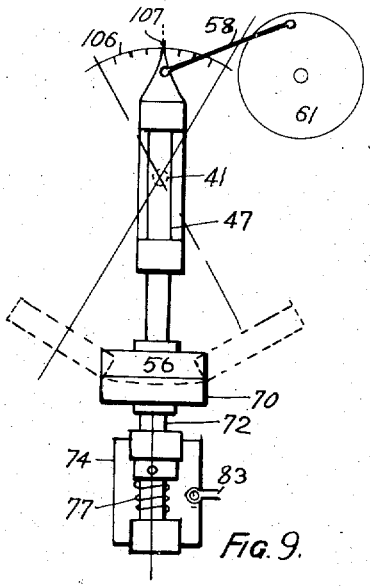

Fig. 8 is a sectional elevation on line 8—8 in Fig. 7.

Figs. 9 to 30 are diagrammatic views illustrating the process of grinding.

Referring to Figs. 1 to 6 which illustrate a machine by means of which lenses can be ground by my process. The framing 31 has bearings 32 for the main driven spindle 33 which is provided with a pulley 34. On the spindle 33 is a miter wheel 35 gearing with a miter wheel 36 on a vertical spindle 37 in bearings 38 also contained in the framing 31. On the top end of the vertical spindle 37 is a miter wheel 39 gearing with a miter wheel 40 that is on one end of the horizontal spindle 41 that has bearings 42 in a sleeve 43. The sleeve 43 has also a bearing 44 in the main frame 31 and has two projecting members 45 which form bearings 46 for the vertical spindle 47 that has a miter wheel 48 gearing with the miter wheel 49 on the horizontal spindle 41. The spindle 47 has a third bearing 50 in the extension bracket 51 which bracket has a vertical slot 52 and clamping screws 53 which take into the two projecting members 45. The miter wheel 48 is slidably affixed to the vertical spindle 47 which is vertically adjustable by means of the bracket 51 and collar 54. The spindle 47 has at its lower end a chuck or face plate 55 to which is attached a blank of glass or the like 56 constituting one of the opposing surfaces to be ground as hereinbefore mentioned.

The spindle 47 is adapted to be oscillated by means of the radial arm 57 on sleeve 43 which is connected with the crank disk 61 by rod 58 which is adjustable by means of the crank pin 59 which takes in slot 60. The crank disk 61 is mounted upon a horizontal spindle 62 supported in bearings 63 in bracket 64 that is secured to the main framing 31. The disk 61 also forms a miter wheel which gears with the miter wheel 65 upon the vertical spindle 66 that has bearings 67 in the main frame 31. At the lower end of the spindle 66 is another miter wheel 68 gearing with a miter wheel 69 upon the main driven shaft or spindle 33 hereinbefore mentioned.

The second opposing surface 70 which may either be a blank of glass or hard abrading material is oppositely disposed and held by a chuck or mounted upon a face plate 71 on the end of the vertical spindle 72 which is in the same straight line as spindle 47. The spindle 72 has bearings 73 in block 74 which is adapted to move laterally on the block 75 which in turn is vertically slidable in the bed 76. The spindle 72 is slidably adjustable and has a coil spring 77 and an adjustable collar 78 and is rotated by the universal joint 121 and cable 122. The vertical slide block 75 is secured in desired position by a clamp nut 79 on the lug 80 which takes in the vertical slot 81 in framing 31. The lateral slide block 74 which has a clamping screw 82 is adjustably connected to the crank disk 86 by connecting rod 83 and crank pin 84 which is movable in slot 85. The crank disk 86 is mounted on spindle 87 which has bearing in block 88 that is slidable in the vertical slot 89 in framing 31 and is provided with a clamping nut 90. On the opposite end of the spindle 87 is a miter wheel 91 which gears with a miter wheel 92 that is adjustably affixed on the vertical spindle 93 that has bearings 94. This spindle 93 has also another miter wheel 95 gearing with a miter wheel 96 upon a counter shaft or spindle 97 in bearings 98 and which has also a toothed wheel 99 gearing with a toothed wheel 100 upon the driven spindle 33 hereinbefore mentioned.

In the vertical slot 81 in the framing 31 is a sliding block 101 with a clamping bolt 102. This block has an index finger 103 which is adapted to register with the marked scale 104 and is provided for the purpose of ascertaining the length of radius from the axial line of spindle 41 necessary for producing the required curved surface. Affixed to the bearings 44 is a sector plate 105 having marked thereon a scale 106 preferably of degrees. Adapted to register with this scale 106 is a finger 107 affixed to the radial arm 57 on sleeve 43 for the purpose of determining the curvature of the face and the diameter of lens that is to be produced. Referring to Figs. 7 and 8 which illustrate a modified construction of machine particularly suitable for carrying out the invention as applied to the grinding of lenses of great power and small diameter that is to say curved surfaces of small radii. The machine here illustrated comprises a framing 31 having a fixed pin 108 to which is pivoted the radial arm 109 which has an indicating finger 107 adapted to register with the scale 106 marked on the front face of the framing. The radial arm 109 has bearings 46 for the vertical spindle 47 which has a slidable affixed miter wheel 48 and an adjustable collar 54.

The spindle 47 has a chuck or face plate 55 to which the blank 56 of glass or other material constituting one of the opposing surfaces is secured. The spindle 47 has also a miter wheel 48 gearing with a miter wheel 49 on a spindle 41 in a bearing 110 which forms part of the radial arm 109. The spindle 41 is driven by a universal joint 111 and cable 112. The radial arm 109 has a pair of lugs or pins 113 and 114 and a similar pair of lugs or pins 115 and 116 are provided on the front face of the framing 31. A coil spring 117 is adapted to be connected to either of the pins or lugs 113 and 114 on the radial arm 109 and to the lugs 115 and 116 upon the framing according to requirements. The radial arm 109 is adapted to take against an adjustable stop 118 in the quadrant groove 119 in the framing 31. The spindle 72 with the face plate 71 and blank 70 are mounted and operated in a manner similar to that hereinbefore described.

Again referring to Figs. 1 to 6 the operation of the machine is as follows:—

The shaft or spindle 33 is driven by the pulley 34 and conveys its motion to the vertical shaft 37 through the miter wheels 35 and 36 thence to the horizontal spindle or shaft 41 by the miter wheels 39 and 40. The horizontal spindle or shaft 41 transmits its motion to the vertical spindle 47 which carries the blank or opposing surface 56. The spindle 47 has a pendulum motion imparted to it by the crank disk 61 and connecting rod 58 which engages the radial arm 57 on sleeve 43, thus causing the blank to move through an arc, whose center is the intersection of the axial line of horizontal spindle 41 with the axial line of vertical spindle 47. The length of this radius of swing may be varied by raising or lowering the vertical spindle 47 in its bearings 46. The crank disk 61 is set in motion by the miter wheel 65 upon the vertical spindle 66 which spindle receives its motion from the driven shaft or spindle 33 by the miter wheels 68 and 69.

The arc of movements to be given to the spindle 47 which determines the curvature of the face of the lens is ascertained by the movement of the finger 107 which registers with the indicator plate 105 and the desired movement is obtained by adjusting the throw of the crank pin 59 in slot 60 of crank disk 61. The machine is adjusted to obtain the correct radius of swing of the spindle 47 in the following manner. The pointer 103 on sliding block 101 is set to register the desired radius on the scale 104; the spindle 47 together with the bearing bracket 51 is then raised or lowered until the axial center point on the opposing surface 56 is in alinement with the pointer 103. The opposing blanks 56 and 70 are affixed to the face plates 55 and 71 in any suitable manner such as by pitch or the like. The lower opposing blank 70 after being affixed to its face plate 71 on the spindle 72 has its axial center brought into alinement with the axial center of the blank 56, so that the axes of the two spindles 47 and 72 are in the same straight line. This adjustment of the spindle 72 is accomplished by the slide block 74 and clamping screw 82. The surface of the blanks are then brought into contact with one another by the slide block 75 and clamp screw 79. Between the face plate 71 and the bearing 73 is a clearance space for the purpose of allowing the lower opposing member 70 to be depressed by the upper member 56 during the process as hereinafter referred to. This movement is controlled and adjusted by the "setting" of the collar 78 upon the spindle 72. The coil spring 77 is provided for the purpose of keeping the opposing surfaces 56 and 70 in contact under pressure during operation. The spindle 72 receives its rotary motion through the universal joint 121 and cable 122 and both opposing members 56 and 70 are adapted to rotate in the same or in opposite directions as required.

When it is desired that the slide block 74 should be reciprocated to perform another function, the clamp screw 82 is released and the crank pin 84 adjusted to the throw required and the disk 86 is then set in motion by its spindle 87 being driven by the miter wheel 91 gearing with the miter wheel 92 upon the spindle 93 which has a miter wheel 95 gearing with a miter wheel 96 upon the counter shaft 97, the counter shaft 97 being driven by the gear wheel 99 gearing with the gear wheel 100 upon the driven shaft 33. The disk 86 is thrown out of action by disconnecting gears 91 and 92.

Referring to Figs. 7 and 8 the operation of the machine is as follows:—

In this case the radius of swing is measured from the axis of the fixed pin 108 to the axial center on the lower surface of the blank 56 and is correctly fixed as before explained with the aid of the index finger on indicator plate 120.

The spindle 47 is rotated by the miter wheels 48 and 49, universal joint 111 and cable 112. The coil spring 117 is provided to exert a pull upon the radial arm 109 during the rotation of spindle 47 and cause the opposing surface 56 to move through an arc of predetermined radius, the center of which is in the common axial line of the spindles and measured from the axial line of the fixed pin 108. The position of the block 118 determines that arc of movement.

In order to fully describe the process of grinding lenses as carried out by the machine herein described, reference will now be made to Figs. 9 to 30 which are diagrammatic views illustrating the process for the production of ordinary lenses. Referring first to Figs. 9 to 13 the two opposing blanks 56 and 70 are of glass and the apparatus as described with reference to Figs. 1 to 6 is used. The gear wheel 100 is unmeshed from the gear wheel 99 by any well known means thus throwing the crank disk 86 out of gear.

Both blanks 56 and 70 are then brought into contact with each other and adjusted so that their axial centers correspond with the axes of the spindles 47 and 72 which axes are in one and the same straight line.

Figure 10:
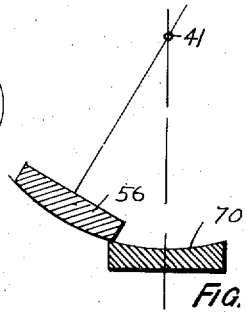
Figure 11:
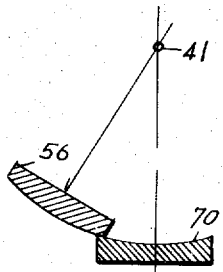
Figure 12:
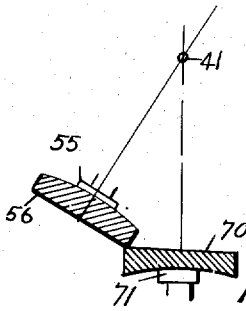
Figure 13:
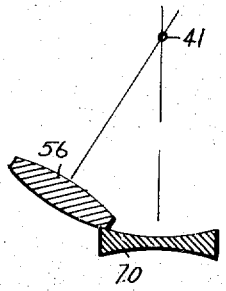

The spindles 47 and 72 are then caused to rotate in the same direction and simultaneously the spindle 47 is given a pendulum action which causes the contacting surface of the blank 56 to grind away in the manner shown in Fig. 10 while the rotating blank 70 has its surface hollowed out (see Fig. 10). The coil spring 77 maintains the surfaces in constant contact under pressure until finally the surfaces of both blanks 56 and 70 have acquired the curves of predetermined radius see Fig. 11 which illustrates the lenses produced, viz., a plano-convex and a plano-concave lens. If it is required to produce a double convex and a double concave lens the blanks 56 and 70 have their curved surfaces affixed to their respective face plates 55 and 71 see Fig. 12 and the process being repeated complete lenses are produced as shown in Fig. 13. The ordinary powdered grinding medium of various grades is introduced between the opposing surfaces during the process.

Figure 14:
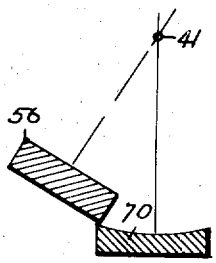

Referring to Fig. 14. When it is desired to produce a lens without the use of grinding power, one of the surfaces 56 is composed of hard abrading material such as carborundum or the like while the other blank 70 is of glass. A repetition of the process hereinbefore described will produce a plano concave or a double concave lens.

Figure 15:
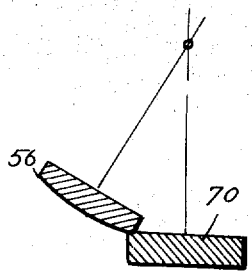
Figure 16:
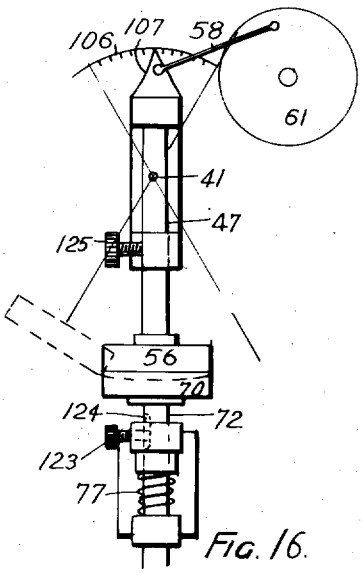
Figure 17:
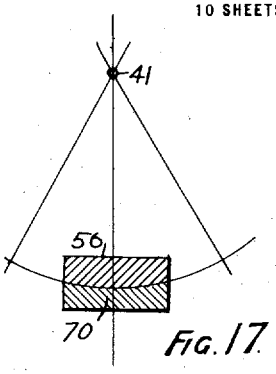

Referring to Fig. 15. If the positions of the blanks are reversed that is to say the blank 56 is of glass and the blank 70 is carborundum a plano-convex or double convex lens is produced.

Referring to Figs. 16 to 22 which illustrate the process for the production of what are termed cylinders, and using as before the machine illustrated in Figs. 1 to 6.

Figure 18:
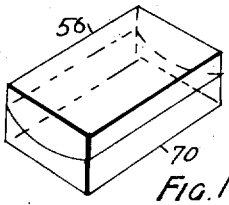

To produce simultaneously a plus and minus cylinder as illustrated in Fig. 18; the opposing blanks 56 and 70 are of glass. In this case neither of the blanks rotates but blank 56 oscillates—see Figs. 16 and 17. Spindle 72 is prevented from rotating by turning off the power and locking it by screw 123 which takes into groove 124 preventing rotary motion while permitting axial motion of spindle 72. The spindle 47 is prevented from rotating by throwing the miter wheel 35 out of gear with the wheel 36 by any well known means and locking the spindle by the clamping screw 125.

Figure 19:
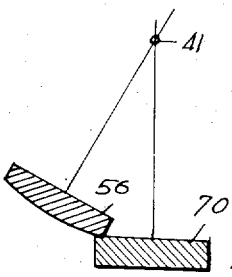
Figure 20:
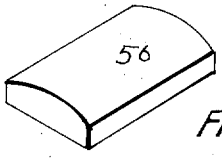

In Figs. 19 and 20 the blank 56 is made of glass and the blank 70 is carborundum or the like and a plus cylinder is produced (see Fig. 20).

Figure 21:
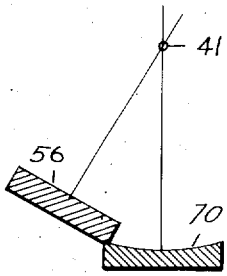
Figure 22:
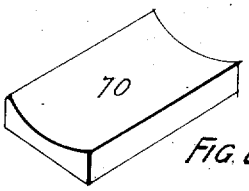

In Figs. 21 and 22 the positions of the blanks are reversed that is to say 56 is of carborundum and 70 is of glass and a minus cylinder is produced. (Fig. 22.)

As hereinbefore mentioned the machine described and illustrated in Figs. 7 and 8 is particularly suitable for carrying out the process for the production of lenses of high power, that is to say, lenses having a curve of small radius. The process as carried out by this machine is illustrated in Figs. 23 to 28.

Figure 23:
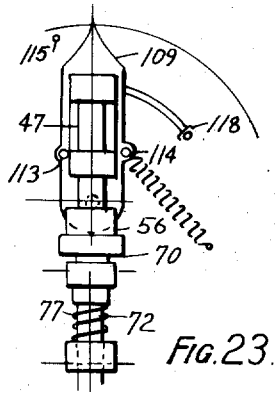
Figure 24:
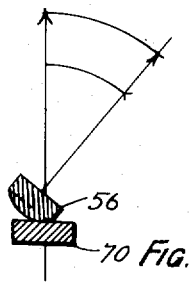

Referring to Figs. 23 and 24 the blank 56 is of glass and the blank 70 of carborundum or the like. The blanks are first centered in the manner hereinbefore described (see Fig. 23).

Both blanks are caused to rotate, but instead of oscillating the spindle 47 as before, a pull is exerted on it from a point above the center of swing in order to cause the surface 56 to move through an arc during the process of grinding. The pull is exerted by the coil spring 117 which is attached to the spindle 47 at 114 and to the framing 116. The adjustable stop 118 determines the arc of movement. The lenses may be completed with two curved surfaces if required.

Figure 25:
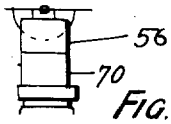
Figure 26:
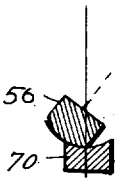

In Figs. 25 and 26 both blanks 56 and 70 are of glass and plano convex and plano concave or double convex and double concave lenses are produced.

Figure 27:
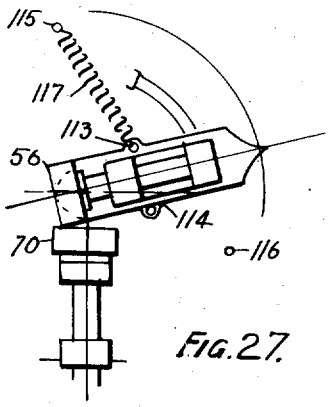
Figure 28:
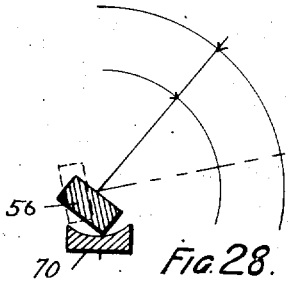

In Figs. 27 and 28 the blank 56 is of carborundum and the blank 70 is of glass. In this case the coil spring 117 is positioned on the other side of the spindle 47 being attached to lug 113 on radial arm and lug 115 on framing. This arrangement produces a plano-concave or double concave lens.

Figure 29:
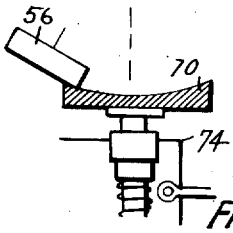
Figure 30:
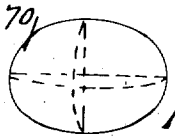

Referring to Figs. 29 and 30 and using the machine illustrated in Figs. 1 to 6.

If the blank 70 does not rotate but is reciprocated while the blank 56 is oscillating an elongated curve will be produced on the surface 70 (see Fig. 30).

By a combination of the different movements herein described any curve or combination of curves can be produced.

The ground surfaces may be polished in any well known way, either by using the machines herein described or with any other polishing device.

What I claim as my invention is:—

1. A process for producing predetermined curved or plane surfaces on lenses, reflectors and other similar objects used for optical purposes, according to which two pieces of glass or similar material are brought into contact under pressure, rotating one of said pieces with respect to the other and further oscillating one of the same through an arc, and reciprocating the other piece of contacting glass tangentially to the arc of movement of the first mentioned piece of glass.

2. An apparatus for grinding lenses comprising a pair of spindles mounted upon a common axial line and adapted to carry on their opposing ends blanks, both spindles rotatable and one spindle adapted to move through an arc and the other to move axially and laterally all for the purpose as herein ascertained.

3. An apparatus for grinding lenses comprising upper and lower spindles mounted upon a common axial line and adapted to carry on their opposing ends blanks, means for rotating the upper spindle, means for inclining the upper spindle, means for imparting to said lower spindle a reciprocatory movement and means for maintaining the contact of the blanks.

4. An apparatus for grinding lenses comprising upper and lower spindles mounted upon a common axial line and adapted to carry on their opposing ends blanks, means for rotating the upper spindle, means for inclining the upper spindle a crank disk and connecting rod for reciprocating the lower spindle, and means for maintaining the contact of the blanks.

Signed at Sydney, New South Wales, Commonwealth of Australia, this twenty eighth day of February, A. D. 1919.

T. W. GARRETT,
*Administrator of John Brockbank, deceased.*